United States Patent
Aizawa

(10) Patent No.: US 7,043,680 B2
(45) Date of Patent: May 9, 2006

(54) FREQUENCY DIVISION MULTIPLEX TRANSMISSION SIGNAL RECEIVING APPARATUS USING A PLURALITY OF CARRIERS

(75) Inventor: Masami Aizawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1079 days.

(21) Appl. No.: 09/969,766

(22) Filed: Oct. 4, 2001

(65) Prior Publication Data

US 2002/0054605 A1   May 9, 2002

(30) Foreign Application Priority Data

Oct. 5, 2000 (JP) ............................. 2000-306459

(51) Int. Cl.
H03M 13/45 (2006.01)
G08C 15/02 (2006.01)

(52) U.S. Cl. .................. 714/776; 714/774; 714/780; 370/207

(58) Field of Classification Search ................ 714/774, 714/776, 780; 370/207; G08C 15/02; H03M 13/45
See application file for complete search history.

(56) References Cited

U.S. PATENT DOCUMENTS

| | | | | |
|---|---|---|---|---|
| 5,805,613 A | * | 9/1998 | Beery et al. ................. | 714/752 |
| 6,246,827 B1 | * | 6/2001 | Strolle et al. ................. | 386/33 |
| 6,278,686 B1 | * | 8/2001 | Alard .......................... | 370/204 |
| 2002/0021773 A1 | * | 2/2002 | Henriksson ................. | 375/347 |
| 2005/0220208 A1 | * | 10/2005 | Aoki ........................... | 375/267 |

FOREIGN PATENT DOCUMENTS

| | | |
|---|---|---|
| CN | 1237841 | 12/1999 |
| EP | 0 689 312 | 12/1995 |
| EP | 0 772 329 | 5/1997 |
| EP | 0 963 086 | 12/1999 |
| EP | 1 054 541 | 11/2000 |
| FR | 2 742 613 | 6/1997 |
| JP | 11-346205 | 12/1999 |

OTHER PUBLICATIONS

K. Harada, et al., ITE '98 ITE Annual Convention 3-1, pp. 31-32, "A Forward Error Correction Method for OFDM Transmission Considering Terrestrial Channel Characteristics", 1998 (with English Abstract).
U.S. Appl. No. 10/773,149, filed Feb. 9, 2004, Aizawa.

* cited by examiner (Continued)

Primary Examiner—R. Stephen Dildine
(74) Attorney, Agent, or Firm—Oblon, Spivak, McClelland, Maier & Neustadt, P.C.

(57) ABSTRACT

A receiving apparatus includes a demodulation circuit which estimates a transfer function of a reception signal in which a time domain has been converted into a frequency domain and demodulates the reception signal according to a demodulation method corresponding to the estimated transfer function, a reliability determining circuit which determines the reliability of the demodulation signal based on the transfer function estimated by the demodulation circuit, a variation detecting circuit which detects a variation amount of the demodulation signal on a frequency base, time base, a de-mapping circuit which subjects the demodulation signal to a de-mapping process and in which the contents of the de-mapping process are changed according to the result of determination in the reliability determining circuit and the result of detection in the variation detecting circuit, an error correction circuit which makes error correction based on the signal subjected to the de-mapping process.

16 Claims, 5 Drawing Sheets

FREQUENCY DIVISION MULTIPLEX TRANSMISSION SIGNAL RECEIVING APPARATUS USING A PLURALITY OF CARRIERS

CROSS-REFERENCE TO RELATED APPLICATIONS

This application is based upon and claims the benefit of priority from the prior Japanese Patent Application No. 2000-306459, filed Oct. 5, 2000, the entire contents of which are incorporated herein by reference.

BACKGROUND OF THE INVENTION

1. Field of the Invention

This invention relates to a frequency division multiplex transmission signal receiving apparatus in a communication field or ground wave digital TV broadcast field and more particularly to a frequency division multiplex transmission signal receiving apparatus which is improved to enhance the receiving performance by reflecting a variation amount of a reception signal varying with time or frequency according to the transmission situation such as multipath or fading on an error correction process.

2. Description of the Related Art

In recent years, the technology in the ground wave digital transmission field dealing with audio and video signals is positively studied and developed. Particularly, in Europe and Japan, an OFDM (Orthogonal Frequency Division Multiplex) system which is one type of an FDM system attracts much attention as an optimum digital transmission (modulation) system. In the OFDM system, modulation and demodulation are performed while data items are assigned to a plurality of carriers which are perpendicular to one another, an inverse FFT (Fast Fourier Transfer) process is performed on the transmission side and an FFT process is performed on the reception side.

Each carrier can be modulated by a desired modulation system and a QAM (Quadrature Amplitude Modulation) system using synchronous detection and a transmission system using delayed detection can be used. In the synchronous detection, a pilot symbol whose property is known is periodically inserted into a transmission signal, a difference between the received pilot symbol and the pilot symbol before transmission is derived on the reception side and equalization of the amplitude and phase of the reception signal is effected. In the delayed detection, a differential coding is effected between reception symbols and the reception signal is demodulated without reproducing the carrier.

In digital transmission, it becomes essential to make error correction of a demodulated signal from the viewpoint of degradation of a signal in the transmission path and enhancement of the transmission characteristic.

In the conventional reception apparatus, error correction is made by using a Viterbi demodulation process optimally set for Gaussian random noise, but in some cases, it is impossible to fully exhibit the performance since the noise distribution is different from the Gaussian distribution in the case of fading transmission path in which a time variation amount of the demodulation signal is significantly large or because of the presence of reflection waves called multipath.

As described above, in the conventional reception apparatus, there occurs a problem that error correction cannot be sufficiently made in the case of a fading transmission path or the presence of reflection waves.

BRIEF SUMMARY OF THE INVENTION

According to one aspect of this invention, there is provided a reception apparatus which receives a frequency division multiplex transmission signal using a plurality of carriers, comprises a demodulation circuit which estimates a transfer function of a reception signal in which a time domain has been converted into a frequency domain and demodulates the reception signal according to a demodulation method corresponding to the estimated transfer function; a reliability determining circuit which is connected to the demodulation circuit and determines the reliability of the demodulation signal demodulated by the demodulation circuit based on the transfer function estimated by the demodulation circuit; a variation detecting circuit which is connected to the demodulation circuit and detects a variation amount of the demodulation signal; a distance measuring circuit which is connected to the demodulation circuit, reliability determining circuit and variation detecting circuit and measures a distance between a reception symbol of the demodulation signal and a representative symbol of a transmission signal and whose measuring method is changed according to the result of determination in the reliability determining circuit and the result of detection in the variation detecting circuit; and an error correction circuit which is connected to the distance measuring circuit and makes error correction based on the distance measured by the distance measuring circuit.

DETAILED DESCRIPTION OF THE INVENTION

There will now be described embodiments of this invention with reference to the accompanying drawings.

Figure 1:
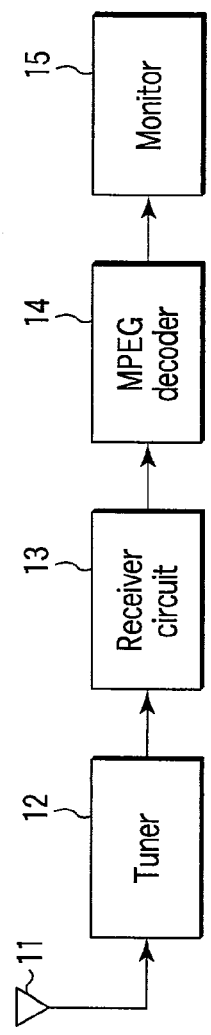
FIG. 1 is a block diagram showing the whole construction of a ground wave digital TV broadcast reception apparatus according to one embodiment of this invention.

FIG. 1 shows the whole construction of a ground wave digital TV broadcast reception apparatus to which a frequency division multiplex transmission signal receiving apparatus according to one embodiment of this invention is applied.

An OFDM signal received by an antenna 11 is tuned by a tuner 12, converted into a digital signal and then transmitted to a receiver circuit 13. The receiver circuit 13 demodulates an output from the tuner 12, makes error correction for the output and outputs an MPEG transform stream (MPEG-TS). MPEG-TS is transmitted to an MPEG decoder 14 and subjected to the expansion process, decoding process and the like so as to be converted into a video signal. The thus converted video signal is transmitted to a monitor 15 and displayed as an image.

Figure 2:
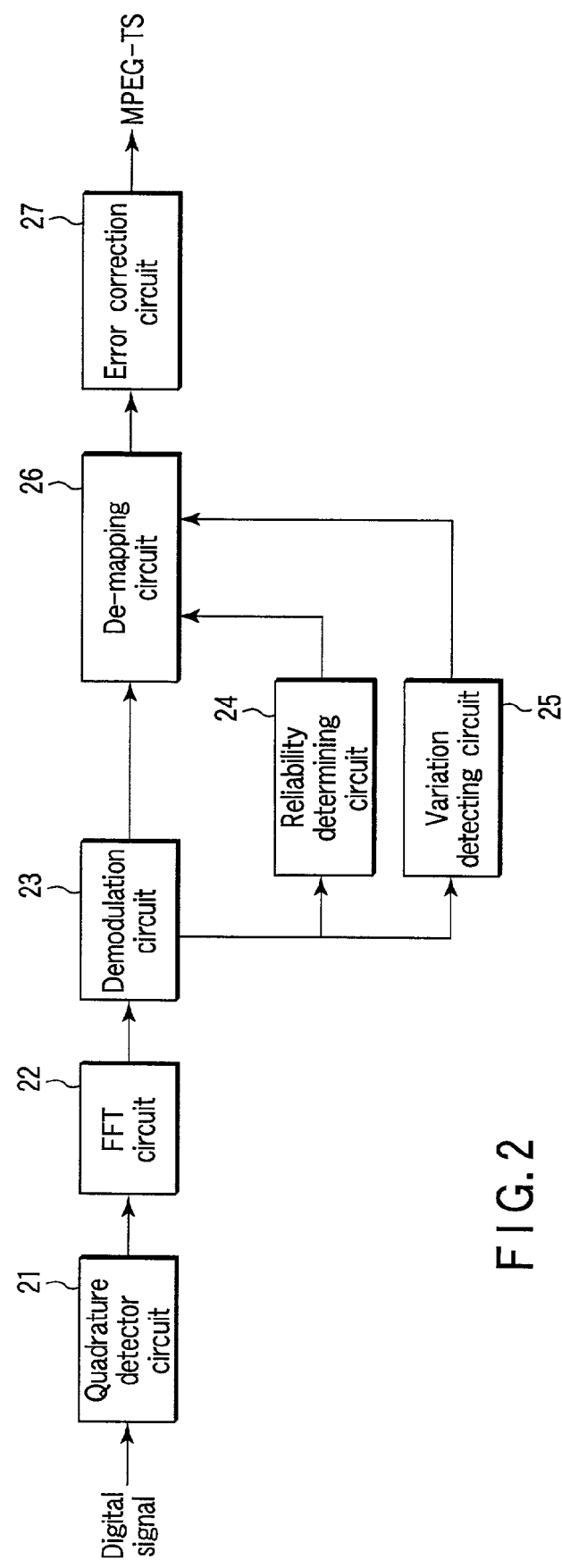
FIG. 2 is a block diagram showing the circuit construction of the main portion of the reception apparatus of FIG. 1.

FIG. 2 shows the detail circuit construction of the receiver circuit 13 of FIG. 1. The whole portion of the receiver circuit 13 is integrated on one semiconductor chip, but in some cases, it can be divided and integrated on a plurality of chips.

The signal tuned by the tuner 12 and converted into the digital signal is subjected to quadrature detection in a quadrature detector circuit 21, converted into a base band signal and then supplied to an FFT (Fast Fourier Transfer) circuit 22. The FFT circuit 22 converts an input signal of time domain into a signal of frequency domain. An FFT output which is converted into the frequency domain in the FFT circuit 22 indicates the phase and amplitude of each carrier of the OFDM signal. The FFT output is supplied to a demodulation circuit 23.

The demodulation circuit 23 estimates the transfer function of each carrier of the FFT output obtained in the FFT circuit 22, demodulates the FFT output by use of a demodulation method corresponding to the estimated transfer function, for example, synchronous detection or delayed detection and generates a demodulation signal.

In the case of the synchronous detection, a pilot signal (pilot symbol) which is a reference signal is periodically inserted in a frequency direction and time direction on the transmission side and equalization of the amplitude and phase is performed by extracting the pilot signal and comparing the pilot signal with a reference value.

The transmission signal and reception signal are expressed by the function of frequency f and time t and if the transmission signal is expressed as X(f,t) and the reception signal is expressed as R(f,t), the following relation is established between X and R.

$$R(f,t)=H(f,t) \cdot X(f,t)+N \tag{1}$$

In the equation (1), H(f,t) is called a transfer function in the transmission path. Further, N indicates additive interference and is thermal noise (Gaussian noise) as one example.

The transmission signal of the pilot signal is known and if it is set as X'(f,t), the reception signal of the pilot signal is set as R'(f,t) and the thermal noise N is neglected, then the transfer function H(f,t) is expressed by the following equation (2).

$$H(f,t)=R'(f,t)/X'(f,t) \tag{2}$$

That is, estimating the transfer function corresponds to deriving the transfer function H(f,t) based on the equation (2).

In the case of the delayed detection, detection can be performed by effecting the complex operation for symbols before and after the signal without reproducing the carrier, and a pilot signal is not necessary unlike the case of the synchronous detection and equalization is not required.

Data (demodulation signal) derived by synchronous detection and equalization or by delayed detection is supplied to a reliability determining circuit 24, variation detecting circuit 25 and de-mapping circuit 26.

The reliability determining circuit 24 calculates a weighting coefficient according to the transfer function estimated for each carrier. That is, the magnitude of the transfer function H(f,t) estimated as described above varies according to the transmission path, and if the transfer function H(f,t) is large, the reliability of the demodulation signal is high, and if it is small, the reliability is low. Therefore, the reliability determining circuit 24 calculates a weighting coefficient which varies in proportion to the magnitude of the transfer function H(f,t). A signal corresponding to the weighting coefficient is supplied to the de-mapping circuit 26.

The variation detecting circuit 25 detects a variation of the transfer function H(f,t) with the frequency or time and numerically expresses the degree of the variation. The numerically expressed signal is supplied to the de-mapping circuit 26.

The de-mapping circuit 26 derives BM (branch metric) which is required at the time of Viterbi decoding according to the demodulation signal from the demodulation circuit 23, and more specifically, it measures Euclidean distances from the respective representative symbols on the IQ axes.

When demodulation is effected, the reception signal is multiplied by a sine-wave component and the reception signal is multiplied by a cosine-wave component in the tuner 12 and the absolute values thereof are derived according to the results of the multiplications. The absolute value signal obtained by multiplying the cosine-wave component is called an I signal and the absolute value signal obtained by multiplying the sine-wave component is called a Q signal. Further, a configuration obtained by plotting the I signal and Q signal on IQ orthogonal axes (IQ axes) is called a constellation.

Figure 3:
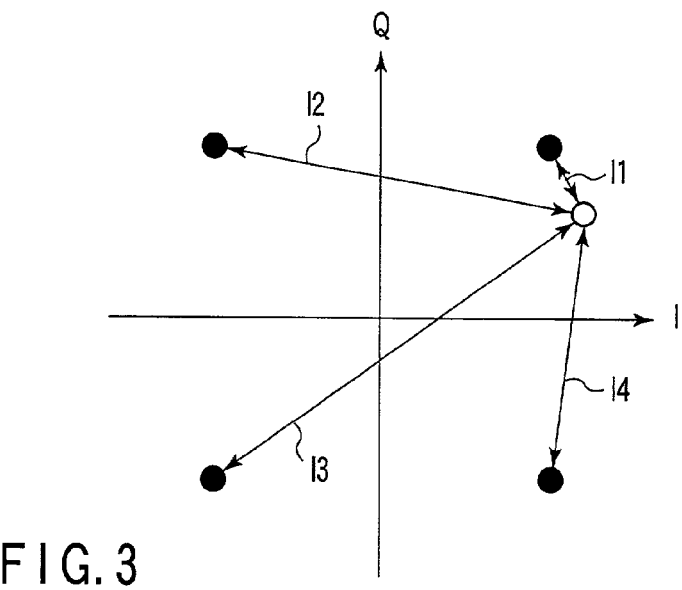
FIG. 3 is a diagram showing a constellation in a case where a representative symbol of a transmission signal takes four values.

FIG. 3 shows a constellation in a case where the representative symbol of the transmission signal takes four values, for example. The representative symbol of four values is provided as indicated by dots in the first to fourth quadrants on the IQ axes. If the reception symbol is demodulated so as to be set in a position indicated by a white dot in FIG. 3, distances l1 to l4 between the reception symbol and the representative symbols of four values are measured. The Euclidean distance corresponds to the above distances. That is, distances between each of the reception symbols and the four representative symbols of the transmission signal are measured in the de-mapping circuit 26.

Further, when deriving BM, the de-mapping circuit 26 weights the signal obtained after de-mapping based on a signal corresponding to the weighting coefficient from the reliability determining circuit 24 and a signal corresponding to the degree of a variation from the variation detecting circuit 25 or selects a different de-mapping method.

An output of the de-mapping circuit 26 is supplied to an error correction circuit 27. The error correction circuit 27 makes error correction for the output of the de-mapping circuit 26 and outputs MPEG-TS.

Next, the operation of the circuit with the construction as shown in FIG. 2 is explained.

Figure 4:
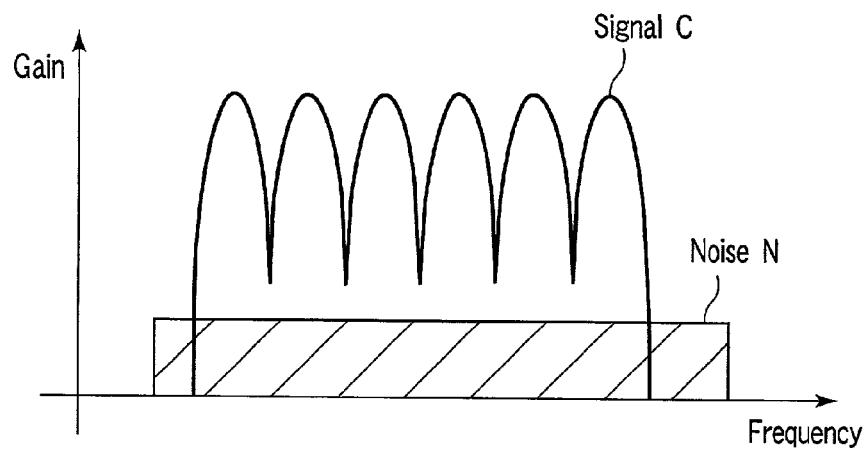
FIG. 4 is a diagram showing a frequency spectrum in a case where an OFDM signal received by the reception apparatus of FIG. 1 is subject to multipath disturbance.

FIG. 4 shows a frequency spectrum in a case where a received OFDM signal has been subject to multipath disturbance. The abscissa indicates frequency and the ordinate indicates gain.

Figure 5:
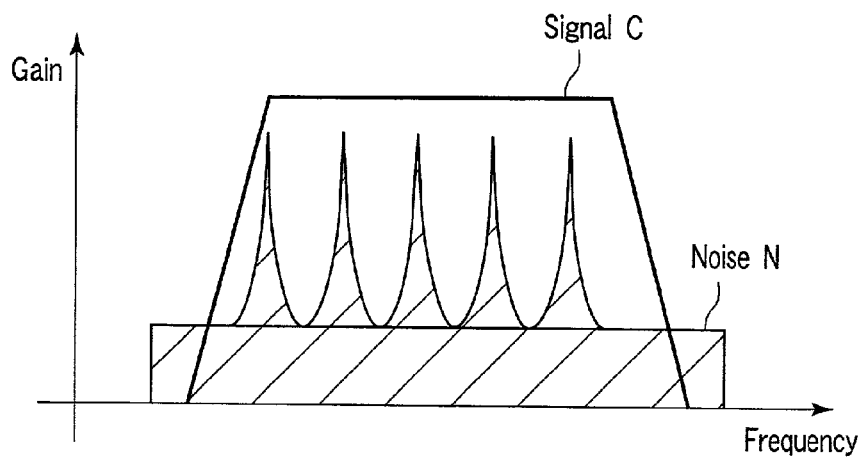
FIG. 5 is a diagram showing a state in which the OFDM signal having the frequency spectrum shown in FIG. 4 is restored into an original flat spectrum by equalization by synchronous detection or delayed detection.

In FIG. 4, C denotes an OFDM signal and N indicates the spectrum of noise (Gaussian noise). In the OFDM signal which has been subject to multipath disturbance, dips (drops of the gain) occur at preset frequency intervals. In this case, the demodulation circuit 23 restores the spectrum of the OFDM signal into an original flat spectrum as shown in FIG. 5 by equalization by use of the pilot signal in synchronous detection or delayed detection. At this time, since the dropped gain is equalized, the noise component is increased accordingly. As a result, a demodulation signal having large noise and small noise mixed together is supplied to the de-mapping circuit 26. The higher error correction ability can be attained by weighting the demodulation signal according to the transfer function (reliability information) instead of de-mapping the demodulation signal as it is and making error correction thereof. The weighting operation thus effected according to the transfer function is disclosed in ITE '98 ITE Annual Convention 3-1 page 31–32, Japan "A forward error correction method for OFDM Transmission considering terrestrial channel characteristics"; Keisuke Harada et. al.; 1998.

However, even if multipath occurs, it is possible to further enhance the characteristic in a case where D/U (desired signal/undesired signal) is substantially 0 dB or where fading occurs.

In the demodulation process, not only a hard decision method for apparently decoding the representative symbol which is closest to the reception symbol, but also a soft decision method for gradually measuring a reception point by use of the distance between the reception symbol and the representative symbol is provided. In this method, for example, if the representative symbol takes two values, the reception symbol is softly decided to be 0.8, for example, based on the relation of the distances between the reception symbol and the representative symbols 0, 1. Further, an erasure correct method is provided which makes correction without much contribution to correction if the reliability of corresponding reception information is low. In the erasure correct method, the whole correction ability can be enhanced by making correction while lowering the reliability of the information rather than correcting the information whose reliability is low as it is. The erasure correct method is described in "'Coding Theory' by Imai, 1990, issued from Corona Co.".

The reliability determining circuit 24 derives a weighting coefficient based on the transfer characteristic estimated for each carrier. By utilizing the above method, the de-mapping circuit 26 selectively weights the demodulation result and enhances the correction ability of the error correction circuit 27 to the uppermost limit to attain the improvement of the characteristic. Further, the de-mapping circuit 26 performs the de-mapping process by use of a signal based on a variation amount of the demodulation signal with frequency or time detected by the variation detecting circuit 25 in addition to a signal based on the reliability attained in the reliability determining circuit 24.

Next, the variation detecting method in the variation detecting circuit 25 is specifically explained.

Figure 6:
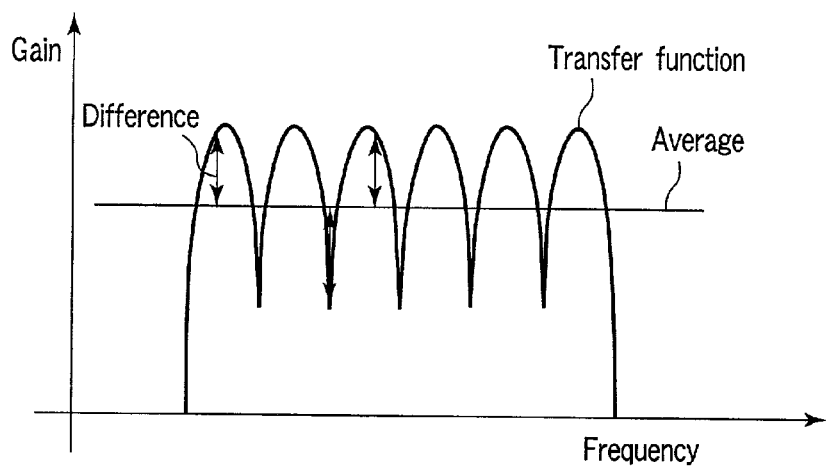
FIG. 6 is a diagram showing a frequency spectrum of an OFDM signal (transfer function) which has been subject to multipath disturbance.

FIG. 6 shows the frequency spectrum of an OFDM signal (transfer function) which has been subject to multipath disturbance. Also, in this case, the abscissa indicates frequency and the ordinate indicates gain.

The variation detecting circuit 25 receives a transfer function estimated in the demodulation circuit 23 or a signal similar thereto in order to obtain a variation in the transfer function and derives the total sum of absolute values of differences between the signal components and the average value of the signal. In this case, the square sum may be derived instead of the total sum of the absolute values. Each of the differences indicated by an arrow in FIG. 6 is integrated along the frequency base to derive a variation amount in one symbol of the OFDM signal.

The range in which the total sum is derived is a one-symbol period of the OFDM signal and FIG. 6 shows a case where only a variation on the frequency base is detected. Assuming now that the average value in the one-symbol period of the OFDM signal is Have, time is t, the transfer function at the frequency f is H(f,t), and the sample number is N, then a variation amount var can be expressed by the following equation (3).

$$var = \frac{1}{N} \cdot \sum_{f} |H(f,t) - Have| \tag{3}$$

The variation detecting circuit 25 generates a coefficient signal for weighting based on the variation amount var derived by use of the equation (3) and supplies the signal to the de-mapping circuit 26. The de-mapping circuit 26 weights the demodulation signal after de-mapping based on the coefficient signal or selects a different de-mapping method. In a simple case, the weighting process can be effected by setting the weighting coefficient to "1" when the variation amount var is "0", setting a larger weighting coefficient as the variation amount var becomes larger, and multiplying the demodulation signal (Euclidean distance) by the thus set coefficient.

Creation of the weighting coefficient by the variation detecting circuit 25 can be attained by use of a method using a ROM which stores a table of weighting coefficients with respect to various variation amounts var, a method utilizing the operation, or a method obtained by combining the above two methods.

Figure 7:
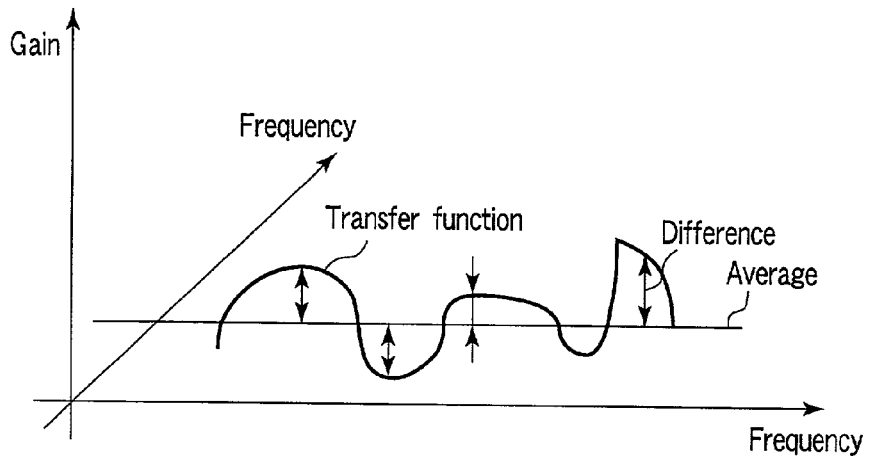
FIG. 7 is a diagram showing a state in which the transfer function varies on the time base.

As shown in FIG. 7, if the transfer function varies on the time base, the total sum of absolute values of differences between signal components and the average value of the signal on the time base like the case of the frequency base in order to detect the above variation amount. A variation amount var by taking variations on the frequency base and time base into consideration can be expressed by the following equation (4).

$$var = \frac{1}{N} \cdot \sum_{f} \sum_{t} |H(f,t) - Have| \tag{4}$$

Of course, it is possible to detect only one of the variation amounts on the frequency base and time base. In this example, a value obtained by normalization by use of the sample number N is called a variation amount.

Figure 8:
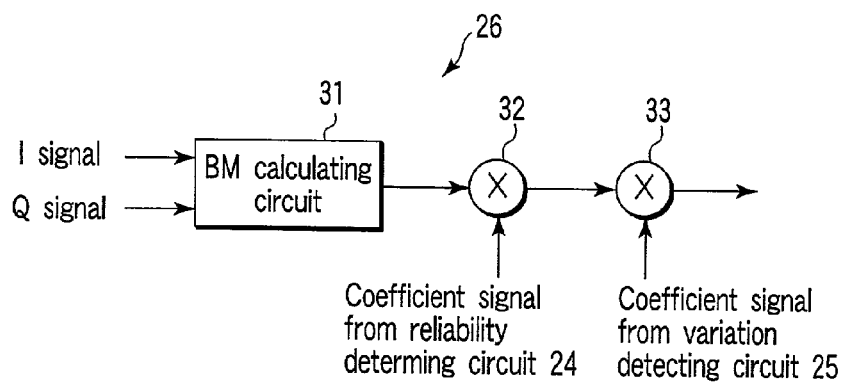
FIG. 8 is a block diagram showing an example of the circuit construction of a de-mapping circuit in the circuit of FIG. 2.

FIG. 8 shows an example of the circuit construction of the de-mapping circuit 26 in a case where the demodulation signal after de-mapping is weighted based on the weighting coefficient signals created in the reliability determining circuit 24 and variation detecting circuit 25 in FIG. 2. The de-mapping circuit 26 includes a BM calculating circuit 31 which calculates BM based on I and Q signals, a multiplier 32 which multiplies BM derived in the BM calculating circuit 31 by a weighting coefficient signal created in the reliability determining circuit 24, and a multiplier 33 which multiplies an output from the multiplier 32 by a weighting coefficient signal created in the variation detecting circuit 25.

Figure 9:
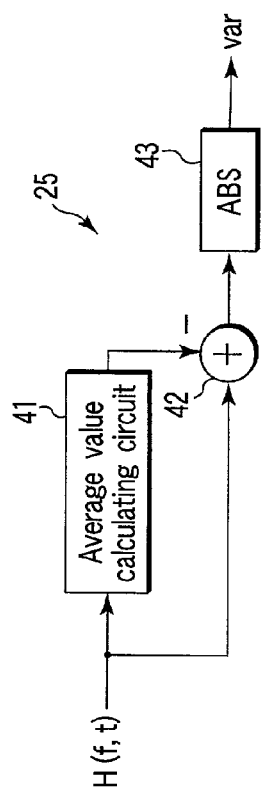
FIG. 9 is a block diagram showing an example of the circuit construction of a variation detecting circuit in the circuit of FIG. 2.

FIG. 9 shows an example of the circuit construction of the variation detecting circuit 25 of FIG. 2. The variation detecting circuit 25 includes an average value calculating circuit 41 which calculates an average value Have in a one-symbol period based on the transfer function H(f,t), a subtracter 42 which subtracts the average value Have from the transfer function Hf,t, and an absolute value calculating circuit (ABS) 43 which calculates the absolute value of an output of the subtracter 42.

Figure 10:
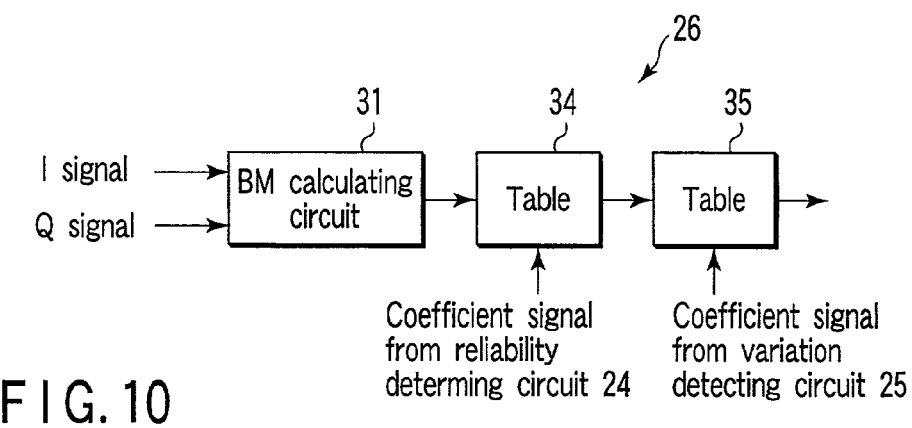
FIG. 10 is a diagram showing another example of the circuit construction of the de-mapping circuit in the circuit of FIG. 2.

FIG. 10 shows an example of the circuit construction of the de-mapping circuit 26 in a case where a different de-mapping method is selected based on the weighting coefficient signals created in the reliability determining circuit 24 and variation detecting circuit 25 in FIG. 2. The de-mapping circuit 26 includes a BM calculating circuit 31 which calculates BM based on I and Q signals, a table 34 which has a plurality of different output values corresponding to BM derived in the BM calculating circuit 31 and selects and outputs one of the different output values based on a weighting coefficient signal created in the reliability determining circuit 24, and a table 35 which has a plurality of different output values corresponding to the output from the table 34 and selects and outputs one of the different output values based on a weighting coefficient signal created in the variation detecting circuit 25. That is, in the de-mapping circuit 26 shown in FIG. 10, different de-mapping methods can be selected based on the weighting coefficient signals created in the reliability determining circuit 24 and variation detecting circuit 25.

According to the ground wave digital TV broadcast receiving apparatus of the above embodiment, the weighting coefficient signals are generated by use of a signal based on a variation amount of the demodulation signal with frequency or time detected by the variation detecting circuit 25 in addition to a signal based on the reliability attained in the reliability determining circuit 24 and the de-mapping circuit 26 weights the demodulation signal according to the weighting coefficient signals or selects a different de-mapping method so that the error correction ability of the error correction circuit 27 can be enhanced.

Figure 11:
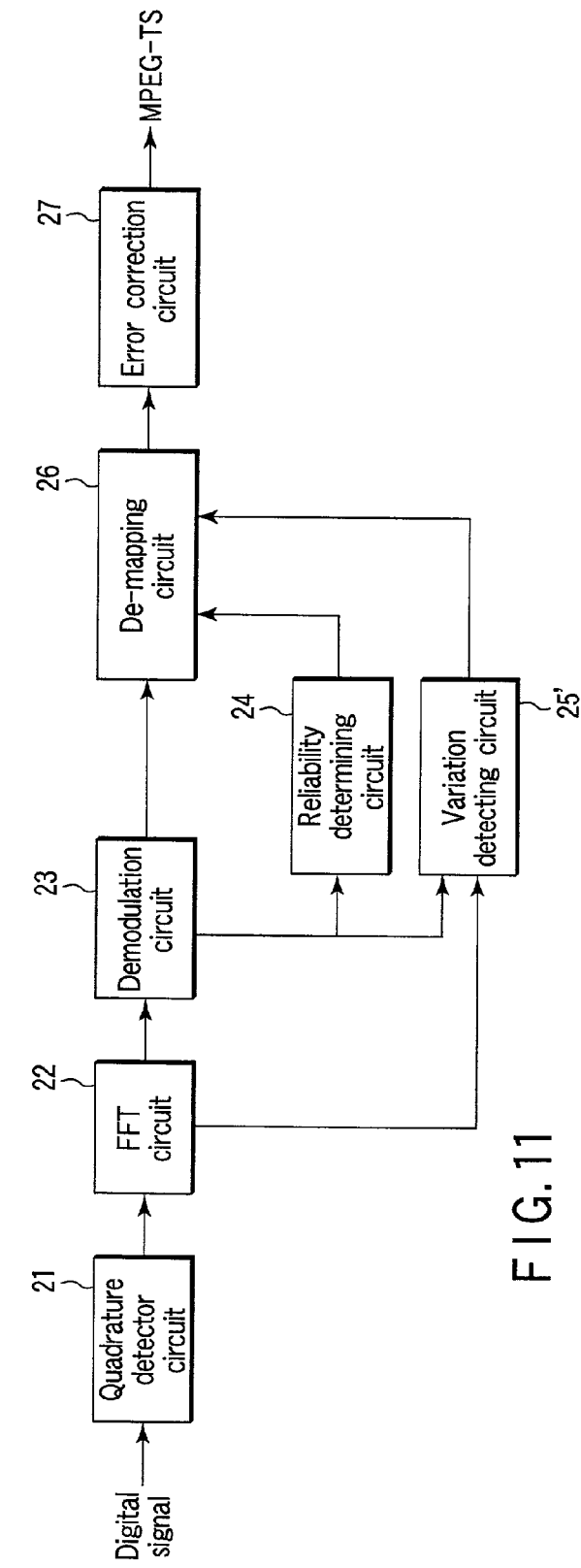
FIG. 11 is a block diagram showing the circuit construction of the main portion of a ground wave digital TV broadcast reception apparatus according to another embodiment of this invention.

FIG. 11 shows the detail circuit construction of a receiver circuit 13 of FIG. 1 according to another embodiment of this invention. The whole portion of the receiver circuit 13 is integrated on one semiconductor chip, but in some cases, it can be divided and integrated on a plurality of chips. Portions which correspond to those of FIG. 2 are denoted by the same reference numerals and the explanation thereof is omitted.

The receiver circuit of this embodiment weights an output of a de-mapping circuit 26 by taking a difference in the modulation system and a coding rate into consideration in addition to a variation amount of a demodulation signal with time or frequency.

In general, since the free distance of a code becomes different by puncture (discarding part of the coding bits) if the coding rate is different, the performance against disturbance becomes different. In this case, the optimum value of a weighting coefficient under disturbance such as multipath and fading becomes different.

Therefore, in this embodiment, a variation detecting circuit 25' detects a difference in the modulation system and the coding rate in addition to a variation of the demodulation signal with frequency or time and derives a weighting coefficient. Information based on the difference in the modulation system and the coding rate is output from an FFT circuit 22 and information items are supplied to the variation detecting circuit 25'.

Figure 12:
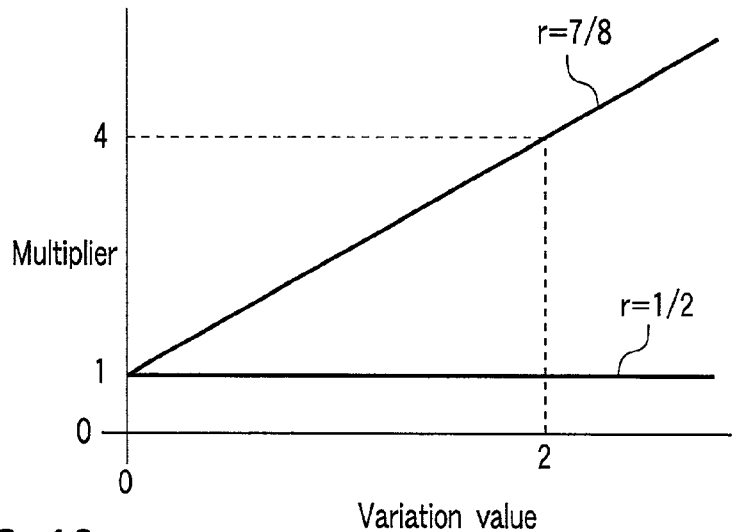
FIG. 12 is a diagram showing a state in which a variation amount of a demodulation signal with time or frequency is changed according to a coding rate in the reception apparatus of FIG. 11.

For example, when attention is paid to the coding rate, the coding rate of r=½ exhibits higher resistance to disturbance and an influence by a variation due to multipath and fading becomes less. In this case, as shown in FIG. 12, the weighting coefficient is fixed at a magnification of "1" irrespective of the variation amount of the demodulation signal with frequency or time. On the other hand, in the case of the coding rate of r-⅞ which exhibits low resistance to disturbance, the coefficient to be multiplied by the variation amount with frequency or time is changed according to the coding rate, for example, the weighting coefficient is set at a magnification of "1" when the variation amount of the demodulation signal with frequency or time is "0" and the weighting coefficient is set at a magnification of "4" when the variation amount of the demodulation signal with frequency or time is "2".

By the above method, the error correction ability of the error correction circuit 27 can be further enhanced.

Further, the apparatus can be designed to cope with an individual system, for example, only the coding rate or only the modulation system.

Figure 13:
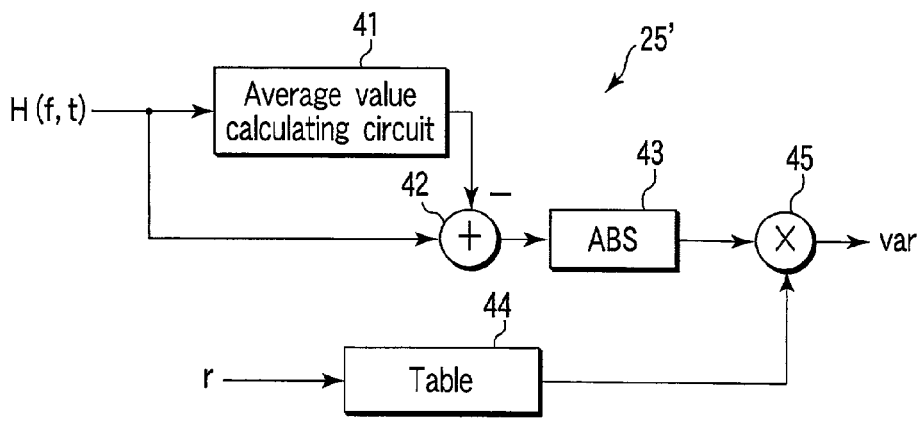
FIG. 13 is a block diagram showing an example of the circuit construction of a variation detecting circuit of the circuit of FIG. 11.

FIG. 13 shows an example of the circuit construction of the variation detecting circuit 25' of FIG. 11 in a case where a coefficient to be multiplied by the variation amount of the demodulation signal with frequency or time is changed according to the coding rate. The variation detecting circuit 25' is different from that of FIG. 9 in that the variation detecting circuit 25' further includes a table 44 which outputs various coefficients corresponding to coding rates r and a multiplier 45 which multiplies the output of the absolute value calculating circuit 43 by the coefficient output from the table 44.

In the above embodiment, a coefficient to be multiplied by the variation amount with frequency or time can be changed according to the modulation system by using a table which outputs various coefficients corresponding to modulation systems instead of the table 44 which outputs the various coefficients corresponding to the coding rates r.

In each of the above embodiments, a case wherein this invention is applied to a ground wave digital TV broadcast reception apparatus is explained, but this invention can be applied to a cable TV broadcast reception apparatus of digital system by using a signal input via a cable instead of a signal input via the antenna and can be further applied to another type of digital communication apparatus.

Further, this invention is not limited to the OFDM reception apparatus and can be easily applied to an FDM reception apparatus which receives a frequency division multiplex signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A receiving apparatus which receives a frequency division multiplex transmission signal using a plurality of carriers, comprising:
   a demodulation circuit which estimates a transfer function of a reception signal in which a time domain has been converted into a frequency domain and demodulates the reception signal according to a demodulation method corresponding to the estimated transfer function;
   a reliability determining circuit which is connected to said demodulation circuit and determines the reliability of the demodulation signal demodulated by said demodulation circuit based on the transfer function estimated by said demodulation circuit;
   a variation detecting circuit which is connected to said demodulation circuit and detects a variation amount of the demodulation signal;
   a distance measuring circuit which is connected to said demodulation circuit, reliability determining circuit and variation detecting circuit and measures a distance between a reception symbol of the demodulation signal and a representative symbol of a transmission signal and whose measuring method is changed according to the result of determination in said reliability determining circuit and the result of detection in said variation detecting circuit; and
   an error correction circuit which is connected to said distance measuring circuit and makes error correction based on the distance measured by said distance measuring circuit.

2. The receiving apparatus according to claim 1, wherein said variation detecting circuit detects a variation amount on a frequency base of the demodulation signal.

3. The receiving apparatus according to claim 1, wherein said variation detecting circuit detects a variation amount on a time base of the demodulation signal.

4. The receiving apparatus according to claim 1, wherein said variation detecting circuit detects a variation amount on a frequency base of the demodulation signal and a variation amount on a time base of the demodulation signal.

5. The receiving apparatus according to claim 1, wherein said demodulation circuit, reliability determining circuit, variation detecting circuit, distance measuring circuit and error correction circuit are integrated on one semiconductor chip.

6. The receiving apparatus according to claim 1, wherein said distance measuring circuit includes:
   a BM (blanch metric) calculating circuit which is connected to said demodulation circuit and derives BM from the demodulation signal demodulated by said demodulation circuit;
   a first multiplier which is connected to said BM calculating circuit and reliability determining circuit and multiplies BM derived by said BM calculating circuit by a weighting coefficient signal created by said reliability determining circuit; and
   a second multiplier which is connected to said first multiplier and variation detecting circuit and multiplies an output of said first multiplier by a weighting coefficient signal created by said variation detecting circuit.

7. The receiving apparatus according to claim 1, wherein said variation detecting circuit includes:
   an average value calculating circuit which is connected to said demodulation circuit and derives an average value of the transfer function in one symbol period from the transfer function estimated by said demodulation circuit;
   a subtracter which is connected to said demodulation circuit and average value calculating circuit and subtracts the above average value from the transfer function estimated by said demodulation circuit; and
   an absolute value calculating circuit which is connected to said subtracter and calculates the absolute value of an output of said subtracter.

8. The receiving apparatus according to claim 2, wherein said variation detecting circuit changes the detected variation amount according to a modulation system of the transmission signal.

9. The receiving apparatus according to claim 3, wherein said variation detecting circuit changes the detected variation amount according to a modulation system of the transmission signal.

10. The receiving apparatus according to claim 4, wherein said variation detecting circuit changes the detected variation amount according to a modulation system of the transmission signal.

11. The receiving apparatus according to claim 2, wherein said variation detecting circuit changes the detected variation amount according to a coding rate of the transmission signal.

12. The receiving apparatus according to claim 11, wherein said variation detecting circuit includes:
   an average value calculating circuit which is connected to said demodulation circuit and derives an average value of the transfer function in one symbol period from the transfer function estimated by said demodulation circuit;
   a subtracter which is connected to said demodulation circuit and average value calculating circuit and subtracts the above average value from the transfer function estimated by said demodulation circuit;
   an absolute value calculating circuit which is connected to said subtracter and calculates the absolute value of an output of said subtracter;
   a table which stores and outputs various coefficients corresponding to coding rates of the transmission signal; and
   a multiplier which is connected to said absolute value calculating circuit and table and multiplies the output of said absolute value calculating circuit by a coefficient output from said table.

13. The receiving apparatus according to claim 3, wherein said variation detecting circuit changes the detected variation amount according to a coding rate of the transmission signal.

14. The receiving apparatus according to claim 13, wherein said variation detecting circuit includes:
   an average value calculating circuit which is connected to said demodulation circuit and derives an average value of the transfer function in one symbol period from the transfer function estimated by said demodulation circuit;
   a subtracter which is connected to said demodulation circuit and average value calculating circuit and subtracts the above average value from the transfer function estimated by said demodulation circuit;

an absolute value calculating circuit which is connected to said subtracter and calculates the absolute value of an output of said subtracter;

a table which stores and outputs various coefficients corresponding to coding rates of the transmission signal; and a multiplier which is connected to said absolute value calculating circuit and table and multiplies the output of said absolute value calculating circuit by a coefficient output from said table.

15. The receiving apparatus according to claim 4, wherein said variation detecting circuit changes the detected variation amount according to a coding rate of the transmission signal.

16. The receiving apparatus according to claim 15, wherein said variation detecting circuit includes:

an average value calculating circuit which is connected to said demodulation circuit and derives an average value of the transfer function in one symbol period from the transfer function estimated by said demodulation circuit;

a subtracter which is connected to said demodulation circuit and average value calculating circuit and subtracts the above average value from the transfer function estimated by said demodulation circuit;

an absolute value calculating circuit which is connected to said subtracter and calculates the absolute value of an output of said subtracter;

a table which stores and outputs various coefficients corresponding to coding rates of the transmission signal; and a multiplier which is connected to said absolute value calculating circuit and table and multiplies the output of said absolute value calculating circuit by a coefficient output from said table.

* * * * *